United States Patent Office 2,914,587
Patented Nov. 24, 1959

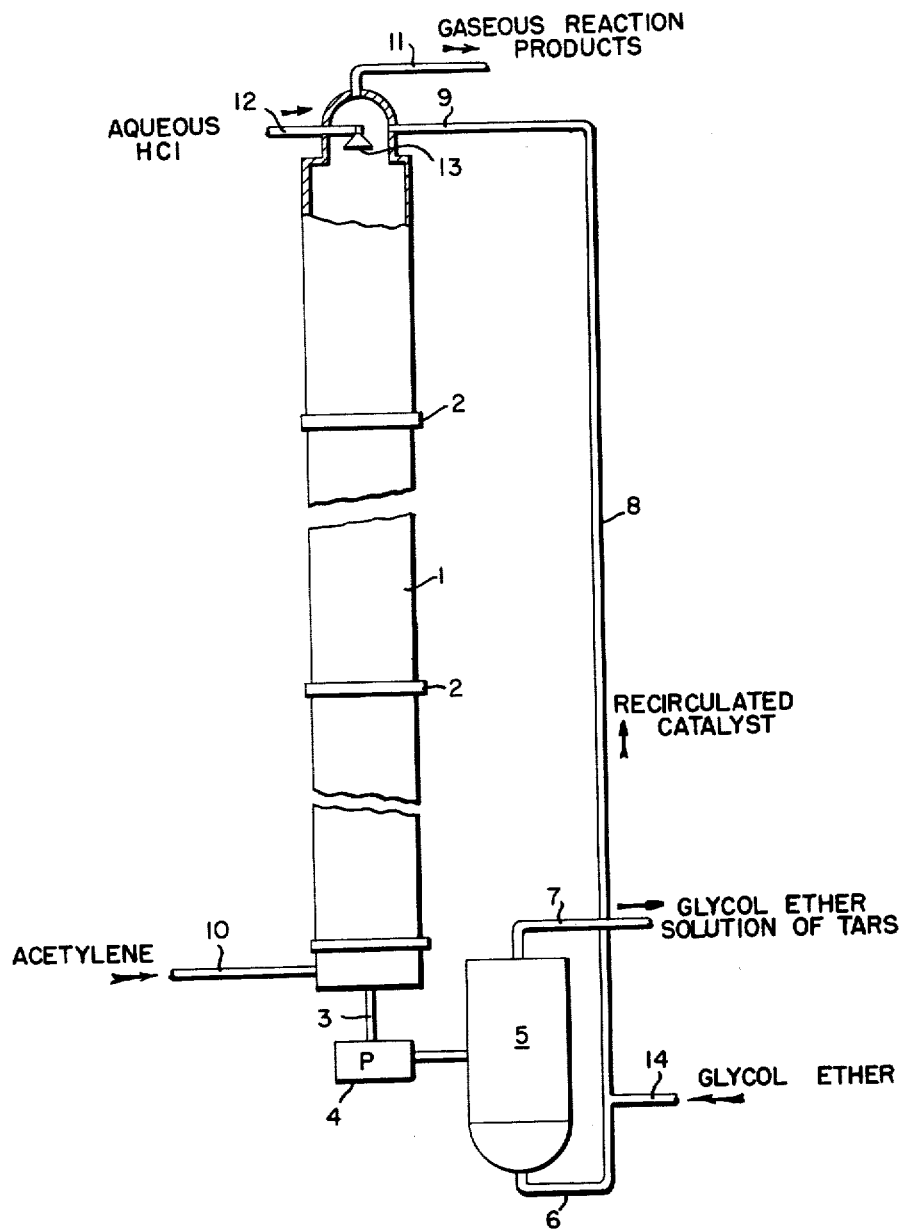

2,914,587

REMOVAL OF TARRY MATERIALS IN THE PROCESS FOR MAKING VINYLACETYLENE FROM ACETYLENE

Ray Anderson Crancer, Whitehall, Mich., John Richard Goertz, Clarksville, Ind., and James Warren Graham, Muskegon, Mich., assignors to E. I. du Pont de Nemours and Company, Wilmington, Del., a corporation of Delaware Application June 28, 1957, Serial No. 669,408

6 Claims. (Cl. 260—678)

This invention relates to a chemical process, and more particularly to a continuous process for the manufacture of monovinylacetylene from acetylene in which acetylene is passed through an aqueous cuprous chloride catalyst solution. This application is a continuation-in-part of our application S.N. 604,541 filed August 16, 1956 and now abandoned.

When an excess of acetylene is passed through an aqueous catalyst solution of cuprous chloride and an alkali metal chloride such as potassium chloride, monovinylacetylene is formed, together with small amounts of divinylacetylene and higher polymers of acetylene, as well as small amounts of other by-products. The more volatile products pass out of the reaction zone in the acetylene stream, but the nonvolatile tarry products remain behind and gradually build up in the reactor, causing trouble in various ways.

When the reaction is carried out in a vertical tower divided into sections by means of perforated plates, in which the catalyst flows from the top to the bottom of the tower counter-current to the acetylene stream which is introduced into the bottom of the column, tarry materials deposit in the column and, as they accumulate, seriously interfere with the flow of the liquid and gas by partially plugging the perforations in the plates of the column. While in this continuous type of apparatus provision has been made to separate the tar from the stream of circulating catalyst solution, it has been found that the tar deposits are formed in the column before reaching the separator, and that it gradually builds up on the walls and plates of the column.

When the reactor is a horizontal cylindrical vessel with a "squirrel-cage" agitator revolving on a horizontal axis, the separation of tar is also troublesome but is less serious because equipment is of simple design.

An improvement of equal or greater importance to be achieved in the manufacture of monovinylacetylene is a reduction in the proportion of by-products (mainly divinylacetylene and higher polymers of acetylene) or, in other words, an increase in the yield of monovinylacetylene, based on the total amount of acetylene converted. Although it is possible to do this by increasing the rate of flow of the acetylene through the catalyst solution and thus decreasing the amount of acetylene converted per pass, the greatly increased cost of processing the increased volume of reaction gas for the recovery of a smaller monovinylacetylene content offsets the advantage gained through the reduction of by-products. It is therefore desired to reduce the amount of by-products without decreasing the rate of conversion of acetylene per pass.

It is an object of the present invention to provide a process for the polymerization of acetylene to monovinylacetylene in which the tarry materials formed in the aqueous catalyst solution can be continually removed from the system. It is a more specific object of this invention to provide a continuous process for the manufacture of monovinylacetylene from acetylene in which a solvent for the tarry materials is incorporated with the aqueous catalyst.

A still further object of the invention is to decrease the amount of by-products formed without decreasing the rate of conversion of acetylene and thereby increase the yield of monovinylacetylene.

According to the present invention, monovinylacetylene is produced by passing acetylene in the form of bubbles through an aqueous cuprous chloride catalyst solution contained in a reactor, there being present in the catalyst solution from 1.5% to 20% of a monoalkylether of diethylene glycol as a separate phase (based on the weight of the catalyst solution), withdrawing a portion of the catalyst solution, allowing it to separate into a lower aqueous layer containing the purified cuprous chloride catalyst, and an upper non-aqueous layer of the alkyl ether of diethylene glycol containing the tarry materials in solution, returning the catalyst solution to the main body of the catalyst in the reactor, and when desired precipitating the tarry materials from the diethylene glycol ether, and recovering the diethylene glycol alkyl ether for reuse.

The process of the present invention may be conveniently carried out in a vertical column containing a plurality of separate intercommunicating reaction zones of conventional type, or the type more particularly disclosed in U.S. Patent 2,759,985, or in a horizontal reactor of the type described in U.S. Patent 1,876,857 the use of which is more particularly described in U.S. Patent 2,048,838.

An essential feature of the present invention is to maintain in contact with the catalyst solution enough of the diethylene glycol monoalkyl ether to saturate the catalyst and, in addition, form a separate phase. At ordinary temperatures about 0.3% of the diethylene glycol monoalkyl ether is required to saturate the aqueous cuprous chloride solution. The ether in the catalyst is depleted in two ways during the operation of the process. Since the ethers are somewhat volatile, some of it passes out in the stream of acetylene and monovinylacetylene. This may be recovered from the solvent used for separation of the gases. Some of the ether of the diethylene glycol is removed from the system with the tar dissolved therein. It may be recovered from this latter solution for reuse, by dilution with water to precipitate the tar, followed by distillation of the resulting aqueous phase. It will be seen from this that some of the ether must be added to the system, preferably continuously, to make up this loss. Other requirements are that it be present as a separate phase throughout the catalyst solution in the reactor and that the ether solution of the tar as it is removed from the system contains preferably from about 5% to about 10% of tar. More dilute solutions of the tar, although operable, are wasteful of the ether, while much more concentrated solutions become viscous and adhere to the walls of the equipment.

In carrying out the invention, it is essential that the separate glycol ether phase should be well dispersed in the catalyst in the reaction zone but that it should be separable into a distinct layer when a portion of the catalyst is removed from the reaction zone in removing the tar. Particularly when the larger proportions of the glycol ether are used, it is desirable to have present a dispersing agent to aid in keeping it in finely divided form during the agitation. Although any type of dispersing agent which operates in the presence of and is not substantially reactive toward the ingredients of the catalyst, particularly the hydrochloric acid, may be used, the non-ionic dispersing agents are in general the most suitable. Appropriate types are the polyethylene oxides terminated with phenols, alcohols, or mercaptans; polyethers of glycols and dibasic acids; esters of polyhydric compounds of fatty acids; and complex compounds combining these features. The specific agent used and its amount will depend upon the amount of agitation in the reaction zone, where a good dispersion is desired, and upon the speed with which it is desired to have the withdrawn catalyst separate into two layers. The agitation given by the bubbles rising through the succession of perforated plates of the column of 2,759,985 or as illustrated in the accompanying drawing has been found to be more efficient than that in the mechanical stirrer in the horizontal reactor of 1,876,857. The separation of the withdrawn portion of the catalyst into two layers may be accelerated by the use of centrifugal devices.

The monoalkyl ethers of diethylene glycol of particular value for use in the present invention are those containing from 1 to 8 carbon atoms in the alkyl group attached through oxygen to the diethylene glycol radical. The diethylene glycol monobutyl ether is preferred to the other lower alkyl ethers of the diethylene glycol because it is less volatile. It is preferred to the higher alkyl ethers which are somewhat less effective because of their lower solubility in the aqueous catalyst solution. It is essential that there be some solubility in the aqueous cuprous chloride catalyst solution, although too great a solubility is not desirable.

In the accompanying drawing which forms a part of this application, a diagrammatic representation of one type of apparatus which may be employed in carrying out the present invention is shown. A reactor column 1, in which the polymerization of the acetylene takes place, is provided with from 1 to 14 spaced, perforated plates 2 having perforations ⅛ inch in diameter and the perforations constituting from 2% to 6% of the plate area. An outlet 3 is provided at the bottom of the column connected through a pump 4 to a separator 5 from which the liquid may be drawn off at both the bottom 6 and top 7. The liquid from the bottom of the separator 5 is then recirculated through a return pipe 8 to the top of the reactor column at 9. An inlet 10 is provided at the bottom of the reactor column for the introduction of acetylene, and an outlet 11 is provided at the top of the column through which gaseous reaction products are drawn off. An inlet line 12 equipped with spray head 13 is provided at the top of the column into which the return pipe 9 may also be connected if desired.

The following example is given to illustrate the invention. The parts and percentages used are by weight.

*Example I*

Into a column, as illustrated in the accompanying drawing, 8 inches in diameter and about 50 feet high, provided with 6 plates the lowest being about 2 feet from the bottom and the remaining plates spaced about 6 feet apart, is charged about 60 gallons of an aqueous catalyst solution containing 35.5% of cuprous chloride ($Cu_2Cl_2$) and about 28.2% of potassium chloride (molecular ratio of 2.1:1.0), about 0.3% of hydrogen chloride and about 2.3% of diethylene glycol monobutyl ether in which about 0.3% of the diethylene glycol monobutyl ether is dissolved in the aqueous catalyst solution, the remainder of the diethylene glycol monobutyl ether being present in a separate phase from the aqueous catalyst solution. The aqueous catalyst solution has a density of about 1.71 when free from gas. This cataylst is circulated by means of the pump 4 through the column at a rate of about 1.5 gallons per minute.

Acetylene previously scrubbed with dilute hydrochloric acid is introduced through the inlet 10 at the bottom of the column under about 43 pounds per square inch pressure at the rate of 55 pounds per hour, while the temperature of the catalyst solution in the column is maintained at about 70° C. by means of cooling coils in the column (not shown). The lowest plate in the column serves to break up the introduced acetylene into uniformly small bubbles, and the space between the plates throughout the column is almost entirely filled by the catalyst solution and the gas bubbles during the operation. Dilute aqueous hydrochloric acid (3% to 10%) is sprayed against the walls of the column through the spray head 13 so that all of the surface of the column with which the acetylene comes in contact is sprayed or washed with dilute hydrochloric acid solution or the acid catalyst itself. The mixture of acetylene and monovinylacetylene, which also contains by-products and vapor of the water and the diethylene glycol monobutyl ether, passes out of the top of the column through the outlet 11 at about 20 pounds pressure to an acid scrubber (not shown) in which the ether is largely condensed. The catalyst solution together with the diethylene glycol monobutyl ether passes slowly downward through the column, the ether collecting the tar formed in the catalyst solution and also washing it from the walls of the column if deposited thereon. The catalyst and ether solution is pumped from the bottom of the column and passed into the separator 5 where in the absence of agitation it rapidly separates into two layers. The lower aqueous catalyst layer is returned to the top of the column through the return 8, while the upper layer in the separator which consists of a solution of tar in the diethylene glycol monobutyl ether, is removed from the top of the separator for recovery of the ether. This may be effected by dilution of the ether-tar solution with water until all of the tar is precipitated. The diethylene glycol monobutyl ether is then separated from the water by distillation and returned to the system.

The conversion of the acetylene to monovinylacetylene is approximately 19.5%, and the over-all yield of monovinylacetylene is approximately 85%. The productivity of monovinylacetylene in the system as described is approximately 5.5 pounds per cubic foot of catalyst solution per hour.

The diethylene glycol monobutyl ether may be introduced into the system through the circulating line 8, as indicated at 14. In like manner, other additives or make-up material may also be added either directly to the column or through the circulating line 8. Where only small amounts of hydrochloric acid are required to maintain the desired acidity of the catalyst solution, the circulating line for the aqueous catalyst may be connected through the spray head 13 so that all portions of the column wall will be washed with acidic solution.

The amount of diethylene glycol monobutyl ether adde to the system is regulated in such a way that a separe phase amounting to at least 1.5% by weight, based on weight of the catalyst, is present in all parts of the colu An amount of the ether should be employed so the concentration of tar in the ether as it is rem from the column is between 5% and 10%. Thi    r solution is removed at the rate of about 35 pound :r hour for elimination of the tar from the system.

*Example II*

The reaction is carried out in a horizontal copper cylinder agitated with a "squirrel cage" agitator revolving about the axis as shown in 1,879,857. It is kept at 70° C. and partly filled with 3.8 liters of a catalyst of the following composition by weight:

| | Percent |
|---|---|
| Cuprous chloride | 37.2 |
| Potassium chloride | 25.8 |
| Hydrogen chloride | 0.3 |
| Water | 25.7 |
| Diethylene glycol monobutyl ether | 10.0 |
| Dispersing agent | 1.0 |

This catalyst thus contains 1.8 mols of potassium chloride per mol of cuprous chloride ($Cu_2Cl_2$). The dispersing agent is a polymer of 10 mols of ethylene oxide, terminated with a $C_{18}$ unsaturated straight chain alcohol.

The glycol ether is dispersed in the aqueous cuprous chloride solution by the mechanical agitation. Acetylene is introduced into one end of the reactor at the rate of 1080 liters per hour and the reaction gas is withdrawn at the other. A portion of the catalyst is withdrawn from the reaction vessel to a decanter in which the ether and the tar dissolved in it forms a separate, upper layer which is removed, while the lower layer, comprising the aqueous catalyst from which the tar has been removed, is returned to the reaction vessel.

The conversion is 14.0% and the yield of monovinylacetylene is 90.5%, based on the total acetylene converted, most of the remaining 9.5% of the acetylene converted going to divinylacetylene. When no ether or dispersing agent is used, the yield is only 80.0% at a conversion 11.0%.

The solution of tar in diethylene glycol monobutyl ether removed from the reaction is preferably treated to recover the ether. This may be done by diluting with water, separating the tar which precipitates, and recovering the ether by distillation for reuse. In any case, diethylene glycol monobutyl ether is added to the reaction mass to make up for that removed by volatilization into the acetylene stream and by direct removal with the tar.

*Example III*

The reaction is carried out in a vertical glass cylinder filled with catalyst solution to a depth of 15 cm., with an inlet at the bottom for introducing the acetylene in the form of bubbles. The volume of catalyst is 200 ml., the temperature is kept at 70° C., and the acetylene is introduced at the rate of 330 ml. per minute. The catalyst has the following composition by weight:

| | Percent |
|---|---|
| Cuprous ...ide | 33.2 |
| ... chloride | 24.4 |
| ...ogen chloride | 0.3 |
| Water | 31.1 |
| Diethylene glycol monobutyl ether | 10.0 |
| Dispersing agent | 1.0 |

This catalyst thus contains 1.95 mols of potassium chloride per mol of cuprous chloride ($Cu_2Cl_2$). The dispersing agent is a polymer of 10 mols of ethylene oxide, terminated with a $C_{18}$ unsaturated straight chain alcohol. The agitation furnished by the gas stream disperses the glycol ether in the aqueous cuprous chloride solution. As a portion of the catalyst is withdrawn and allowed to stand without agitation, it separates rapidly into two layers, of which the lower one, comprising the tar-free catalyst, is returned to the reaction vessel.

The yield of monovinylacetylene, based on the acetylene converted, is 81.0% and the conversion per pass is 11.5%. When the diethylene glycol monobutyl ether and the dispersing agent are omitted from the catalyst, the yield is only 53.0% and the conversion 10.5%.

The process may be operated indefinitely in the processes above illustrated without deposition of tar in the equipment. The presence of the diethylene glycol ether dissolved in the catalyst also appears to be responsible for increasing catalyst productivity in the process. During recirculation the ether also appears to decrease the amount of foaming of the catalyst, thereby allowing the use of a larger volume of catalyst solution in the reactor as compared to the amount of catalyst used when no diethylene glycol monoalkyl ether is employed. This materially increases the output of monovinylacetylene per unit of equipment.

In the invention as illustrated above any conventional cuprous chloride catalyst solution may of course be employed, the preferred catalyst being the aqueous solution of cuprous chloride and potassium chloride.

We claim:

1. In a process for the manufacture of monovinylacetylene from acetylene by passing acetylene in the form of bubbles through an aqueous cuprous chloride catalyst solution, the improvement which comprises maintaining as a separate phase, dispersed in the catalyst solution, from 1.5% to 20.0%, based on the weight of the catalyst solution, of a monoalkyl ether of diethylene glycol containing from 1 to 8 carbon atoms in the alkyl radical, drawing off the catalyst solution containing the dispersed diethylene glycol monoalkyl ether, allowing it to separate in layers, separating the two layers, and returning the catalyst solution to the process.

2. In a continuous process for the manufacture of monovinylacetylene from acetylene by passing acetylene in the form of bubbles through an aqueous cuprous chloride catalyst solution, the improvement which comprises maintaining as a separate phase, dispersed in the catalyst solution, from 1.5% to 20.0%, based on the weight of the catalyst solution, of a monoalkyl ether of diethylene glycol containing from 1 to 8 carbon atoms in the alkyl radical, drawing off the catalyst solution containing the dispersed diethylene glycol monoalkyl ether when the said diethylene glycol monoalkyl ether contains from 5% to 10% of its weight of tarry materials formed in the reaction, allowing the aqueous catalyst solution and the diethylene glycol monoalkyl ether containing the tar to separate in layers, separating the two layers, and returning the catalyst solution to the process.

3. In a continuous process for the manufacture of monovinylacetylene from acetylene by passing acetylene in the form of bubbles through an aqueous cuprous chloride catalyst solution, the improvement which comprises maintaining as a separate phase, dispersed in the catalyst solution, from 1.5% to 20.0%, based on the weight of the catalyst solution, of a monoalkyl ether of diethylene glycol containing from 1 to 8 carbon atoms in the alkyl radical, drawing off the catalyst solution containing the dispersed diethylene glycol monoalkyl ether, allowing it to separate in layers, separating the two layers, precipitating the tar from the non-aqueous layer by dilution with water, distilling the aqueous solution of the diethylene glycol monoalkyl ether, and returning both the catalyst solution and the diethylene glycol monoalkyl ether to the process.

4. In a process for the manufacture of monovinylacetylene from acetylene by passing acetylene in the form of bubbles through an aqueous cuprous chloride catalyst solution, the improvement which comprises maintaining as a separate phase, dispersed in the catalyst solution, from 1.5% to 20.0% based on the weight of the catalyst solution, of monobutyl ether of diethylene glycol, drawing off the catalyst solution containing the dispersed diethylene glycol monobutyl ether, allowing it to separate in layers, separating the two layers, and returning the catalyst solution to the process.

5. In a continuous process for the manufacture of monovinylacetylene from acetylene by passing acetylene in the form of bubbles through an aqueous cuprous chloride catalyst solution, the improvement which comprises maintaining as a separate phase, dispersed in the catalyst solution, from 1.5% to 20.0%, based on the weight of the catalyst solution, of monobutyl ether of diethylene glycol, drawing off the catalyst solution containing the dispersed diethylene glycol monobutyl ether when the said diethylene glycol monobutyl ether contains from 5% to 10% of its weight of tarry materials formed in the reaction, allowing the aqueous catalyst solution and the diethylene glycol monobutyl ether containing the tar as it is drawn off to separate in layers, separating the two layers, and returning the catalyst solution to the process.

6. In a continuous process for the manufacture of monovinylacetylene from acetylene by passing acetylene in the form of bubbles through an aqueous cuprous chloride catalyst solution, the improvement which comprises maintaining as a separate phase, dispersed in the catalyst solution, from 1.5% to 20.0%, based on the weight of the catalyst solution, of monobutyl ether of diethylene glycol, drawing off the catalyst solution containing the dispersed diethylene glycol monobutyl ether, allowing it to separate in layers, separating the two layers, precipitating the tar from the non-aqueous layer by dilution with water, distilling the aqueous solution of the diethylene glycol monobutyl ether, and returning both the catalyst solution and the diethylene glycol monobutyl ether to the process.

References Cited in the file of this patent

UNITED STATES PATENTS

| | | |
|---|---|---|
| 1,926,039 | Downing et al. | Sept. 12, 1933 |
| 2,395,529 | Arnold | Feb. 26, 1946 |
| 2,738,860 | Lorenz et al. | Mar. 20, 1956 |